Feb. 25, 1930.  C. TOYOSHIMA  1,748,808
DEVICE FOR MAKING PLANT COVERS
Filed Feb. 27, 1929
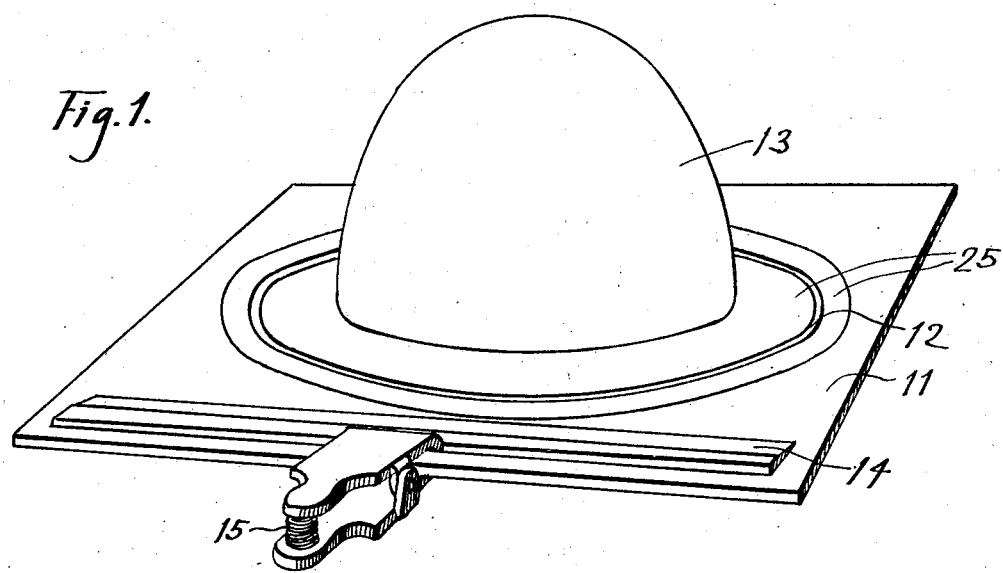
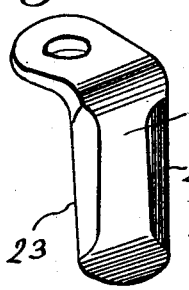
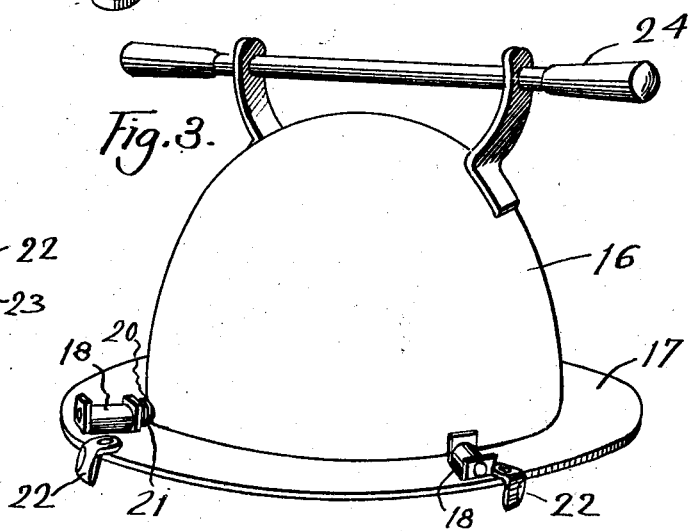
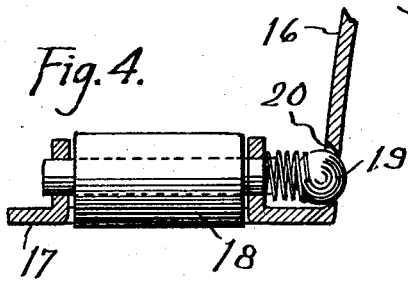
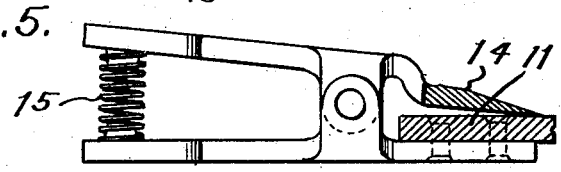
INVENTOR:
CHUSABURO TOYOSHIMA.
BY ATTY:

Patented Feb. 25, 1930

1,748,808

UNITED STATES PATENT OFFICE

CHUSABURO TOYOSHIMA, OF LOS ANGELES, CALIFORNIA

DEVICE FOR MAKING PLANT COVERS

Application filed February 27, 1929. Serial No. 342,983.

This invention relates to a device for molding plant covers, and its objects are to provide elements whereby a sheet of suitable paper or other material may be formed, molded and trimmed to produce a cover adaptable for use in protecting plants, seeds, and prepared surfaces therefor, from insects, and from the deleterious effects of wind, rain, and inclement weather.

Other objects are to provide apparatus of this character, embodying simplicity, efficiency, and ease of manipulation in use.

In the drawings: Figure 1 is a perspective view of a mold device embodying the present invention, showing the male mold member. Fig. 2 is a perspective detail view of a cutter adapted for trimming the edge of the cover. Fig. 3 is a perspective view of the female mold member. Fig. 4 is a fagmentary and sectional view of the mold member, showing the spacing elements mounted thereon, Fig. 5 is a fragmentary and detail view of the clip holder for retaining the material in position in the initial steps of the forming process.

Referring to the drawings, the base 11, is provided with an annular groove 12, spaced apart from the dome-shaped central portion 13. A clip member 14, actuated by spring 15, is adapted to retain a sheet of paper or other material to be molded, in position upon the dome portion 13. The cooperative mold member 16, has a flange 17, extending therefrom, and has three rollers 18, mounted therein, and projecting therefrom, whereby the mold member may be turned easily upon the sheet of material. Other spacing elements consist of balls 19, projecting inwardly through apertures 20, and actuated by springs 21.

For trimming and cutting the sheet of paper material, I provide three cutters 22, mounted on the edges of flange 17, and adapted to extend in groove 12. The cutters 22 have each two cutting edges 23, whereby the cutter is operative with the turning of the mold member 16 in either direction. I provide a handle 24, for the manual manipulation of the upper mold member. The mold members 13 and 16 are preferably made of metal, including the portion 25 having the annular groove 12.

In use, the base with the male mold member is placed upon a table or suitable support, and a sheet of paper or other material (preferably paraffin paper), is inserted in the clamp and between the base and clamp member 14, the sheet of material extending over the forming dome. The cooperative mold member 16 is then placed over the sheet of material, thereby pressing the same upon the dome 13. As the mold member 16 approaches the limit of its operative position, the cutters 22 will pierce the material and enter groove 12. The operator then turns the upper mold member with a reciprocatory and rotary movement, thereby ironing the sheet of material and cutting the same with a projecting base flange. The balls 19 press upon the paper sheet, whereby the two cooperative portions of the mold operate easily and smoothly, and the rollers 18, iron the flange of the material, and also serve for ease of operation. Only a few turns or movements of the mold member serves to form a cover for use in protecting plants or seeded ground. The flange formed on the protector or cover may be covered with soil to retain the device in use. The material is fully trimmed on the initial turning movement of the mold.

From the foregoing description and drawings, it may be seen that I have provided a simple and efficient molding device for making plant covers from sheet material, the device embodying holding elements for the sheet of material, cutting means, and shaping means, all adapted to be manually actuated with a simple oscillative movement, whereby a cover is formed for the purposes set forth.

What is claimed is:

1. The combination with a base, of a dome-shaped mold member projecting upwardly therefrom, the base having an annular groove spaced apart from the mold member, a clamp secured to the base and adapted to hold the sheet of material upon the said dome-shaped mold member, a cooperating mold member adapted to be superimposed upon the first-named mold member, a flange on and projecting from the last-named mold member, and spacing elements mounted on the flange of the last-named mold member.

2. The combination with a base, of a dome-shaped mold member mounted thereon, the base having an annular groove spaced apart from the mold member, clamp elements for retaining a sheet of material, mounted on the base, a cooperative mold member adapted to be superimposed on the first-named mold member, a flange projecting from the last named mold member, a plurality of cutters mounted on the flange and extending in the annular groove in the base, spacing elements serving to hold the mold members in spaced apart position, and a handle for manually manipulating the last-named mold member with an oscillative movement.

3. Cooperative dome-shaped mold members adapted to telescope one within the other, a base integral with the inner mold member, and having an annular groove spaced apart from said inner mold member, a flange on the outer mold member, and cutting elements fixed to the flange and adapted to extend in said annular groove as the outer mold member assumes the limit of its operative position.

4. The combination with a base, of a dome-shaped mold member mounted thereon, the base having an annular groove spaced apart from said mold member, a cooperative mold member adapted to be superimposed on the first-named mold member, a flange at the base of the last-named mold member, ball and roller spacing elements mounted on the last-named mold member and projecting therefrom to engage with a sheet of material, cutting elements on said flange and extending in said annular groove, and a handle for manually manipulating the last-named mold member with an oscillative movement.

5. Cooperative male and female dome-shaped mold members adapted to telescope one within the other with a sheet of material interposed therebetween, a base for the male mold member, a clamp mounted on the base, and serving to retain the sheet of material in position, the base having an annular groove spaced apart from the mold member, a flange on the female mold member, cutting elements mounted on the flange and projecting in the annular groove as the mold member reaches the limit of its operative position, opposed cutting edges on the cutting elements effective in either direction of movement of the mold member, spacing elements mounted on the female mold member and projecting to engage with the sheet of material, and a handle for manually manipulating the last-named mold member with an oscillative movement.

In testimony whereof, I have hereunto affixed my signature.

CHUSABURO TOYOSHIMA.